United States Patent Office.

HENRI RAYMOND VIDAL, OF PARIS, FRANCE.

BLACK DYE.

SPECIFICATION forming part of Letters Patent No. 601,365, dated March 29, 1898.

Application filed July 24, 1897. Serial No. 645,862. (Specimens.) Patented in France March 11, 1897, No. 264,900, and in England March 16, 1897, No. 6,913.

*To all whom it may concern:*

Be it known that I, HENRI RAYMOND VIDAL, of Paris, France, have invented certain new and useful Improvements in Coloring-Matters, (for which I have obtained patents in France, No. 264,900, dated March 11, 1897, and in Great Britain, No. 6,913, dated March 16, 1897,) which are fully described in the following specification.

It is known that new coloring-matters are formed by the condensation of amidobenzo or naphtho-sulfonic acids with amidated, hydroxylated, or diamidated derivatives into ortho, meta, or para benzene or naphthalene. I have found that these new coloring-matters are capable of combining with sulfur so as to form other coloring-matters of different shades or tints. Thus on heating in the presence of sulfur the blue coloring substance obtained by the condensation of paramidophenol and sulfanilic acid I obtain a product which in the presence of an alkaline salt can be dissolved into blue-black, and which directly dyes unmordanted cotton into shades or tints of a very deep black. This coloring-matter is insoluble in acids and has the appearance of a dark porous mass. The alkaline solutions become darker when exposed to the air.

In carrying out my process I proceed in the following manner—that is to say, I heat in an oil-bath, placed in an iron vessel provided with a stirring device, a mixture of the following ingredients: twenty-eight kilograms of a coloring-matter derived from parasulfanilic acid and paramidophenol and twenty-five kilograms of a solution of caustic soda of thirty-three per cent. strength until the mass has dissolved and sufficiently thickened. I then pass into this mixture six kilograms of sulfur, and I maintain the temperature at 170° centigrade until the stirring apparatus stops acting.

It is not necessary that the sulfur be added after the other materials are mixed, as the same result is obtained when the sulfur is added to the coloring-matter before the soda.

I may replace the coloring-matter arising from the action of paramidophenol upon parasulfanilic acid, first, by coloring-matters obtained by the condensation of paramidophenol with naphthionic, metasulfanilic acids; second, by coloring-matters obtained by the condensation of one of the following acids: parasulfanilic, naphthionic, metasulfanilic, with a diamin, or one of the following amido phenols or naphthols: paraphenylene diamin, naphthene diamin, alpha$_1$, alpha$_2$, metamidophenol, amidonaphthol, alpha$_1$, alpha$_2$.

In those instances where I cause sulfur to act upon a coloring-matter derived from a diamin I do not employ caustic soda, because this coloring-matter is insoluble in such compound.

I claim herein, broadly, the new process and the products thereof and have filed a separate divisional application claiming specifically the treatment with sulfur of the condensation product of parasulfanilic acid and ortho or metamidophenol or the corresponding diamins. Said application has serial number 664,085 and was filed December 28, 1897.

Having now particularly described and ascertained the nature of my said invention and in what manner the same is to be performed, I declare that what I claim is—

1. The described coloring-matters obtained by heating the condensation products of paramidophenol and sulfanilic acid in presence of sulfur, said coloring-matters appearing as a dark porous mass, insoluble in acid, soluble in alkalies giving a blue-black color becoming darker on exposure to air, and having the property of directly dyeing unmordanted cotton in shades of very deep black, as set forth.

2. The process of manufacturing coloring-matters consisting in heating the condensation products of parasulfanilic acid and paramidophenol in presence of sulfur, the mass being dissolved in a solution of caustic soda and then evaporated, substantially as described.

In testimony whereof I have signed this specification in the presence of two subscribing witnesses.

HENRI RAYMOND VIDAL.

Witnesses:
 EDWARD P. MACLEAN,
 ANTOINE ROMSANNERLY.